United States Patent [19]
Schumacher

[11] 3,734,579
[45] May 22, 1973

[54] BEARING HOUSING ASSEMBLY

[76] Inventor: Gary B. Schumacher, 320 Park Street, Navarre, Ohio 44662

[22] Filed: Dec. 9, 1970

[21] Appl. No.: 96,379

[52] U.S. Cl. .................................308/20, 220/60 R
[51] Int. Cl. .............................................F16c 13/00
[58] Field of Search...................308/187.1, 20, 207; 220/24, 64, 60 R, 42 D

[56] References Cited

UNITED STATES PATENTS

| 2,837,202 | 6/1958 | Baechli | 308/184 R |
| 2,439,284 | 4/1968 | Buckwalter | 308/207 R |
| 2,663,451 | 12/1953 | Yarnall | 220/24 R |
| 3,338,381 | 8/1967 | Imse | 308/20 X |
| 3,406,438 | 10/1968 | Reilly | 308/20 X |
| 3,489,468 | 1/1970 | Buck | 308/20 |

FOREIGN PATENTS OR APPLICATIONS

| 726,184 | 8/1942 | Germany | 308/187.1 |
| 1,343,363 | 10/1963 | France | 308/187.1 |

*Primary Examiner*—Charles J. Myhre
*Assistant Examiner*—Barry Grossman
*Attorney*—E. Wallace Breisch

[57] ABSTRACT

A bearing housing assembly to seal and simplify the installation of tapered roller bearings, consisting of; a felt seal sealing along the shaft and bushing end of the housing, a bearing housing cap snapping into the housing to seal the open end of said housing, and a bearing retainer ring located between a bearing and a housing cap to locate the bearing within the housing and retain relatively movable bearing members against incidental axial loading tending to unseat them.

8 Claims, 2 Drawing Figures

PATENTED MAY 22 1973

3,734,579

INVENTOR
GARY B. SCHUMACHER

BEARING HOUSING ASSEMBLY

In the application of bearings in a housing to a shaft of a flexible catenary suspension belt conveyor idler such as that shown in U.S. Pat. No. 2,876,890, one problem is sealing the bearing housing against the entrance of foreign matter that exists in the environment in which conveyor belts are used. Such matter would tend to decrease the life of the bearings in the housing. The forces on the shaft of the idler are both radial and axial, and tapered roller bearings are used. The axial forces on the bearing are variable in magnitude and direction because of the variation in material conveyed during the conveying process and the flexibility of the idler itself in conjunction with impacts developed in loading the conveyor. Such variation in direction would unseat a single tapered roller bearing. Either, a bearing which incorporated two sets of rollers tapered in opposite directions in a double row configuration, or two single tapered roller bearings back to back were used. Both of these designs entail not only the added expense of double bearings, but the added cost and disadvantage of the larger bearing housings they required.

The bearing housing of the present invention provides seals to keep foreign matter from the interior of the housing and hence from the bearing within, and a bearing retainer ring which eliminates the need for such double tapered roller bearings or paired back to back roller bearings while decreasing the size of the required bearing housing. The bearing housing is sealed by a felt seal ring placed on the shaft between the inside of the housing and the bearing, and a flexible end cap of elastomeric material sealingly engaged with an end of the housing. The bearing retainer ring is designed to fit within the bearing housing between the bearing and the housing cap. An annular circumferential groove formed in one face of the ring with two lips extending therefrom, has a surface of one lip substantially parallel to the end of the rollers, and a surface of the other lip contacting the bearing cup, thereby preventing the bearing from breaking away from the bearing cup under incidental axial loading in a direction opposite the normal working thrust due to conveyor loading.

These and other objects and advantages of the invention will become readily apparent from the following description and drawings of a preferred embodiment thereof in which.

Figure 1:
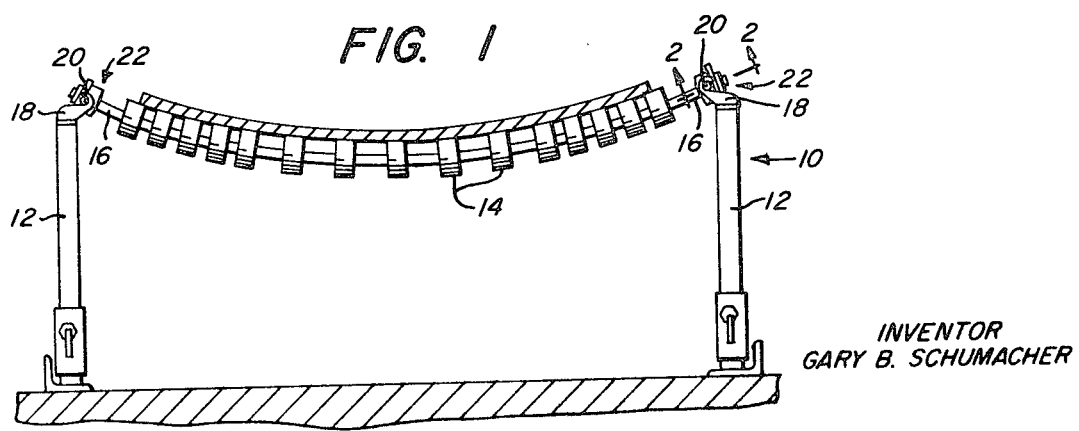
FIG. 1 is a side elevation of a flexible catenary suspension belt conveyor idler incorporating the bearing housing assembly of the present invention.

The present invention has wide applications, but a preferred embodiment is that shown in a flexible catenary suspension belt conveyor idler assembly 10 (FIG. 1) consisting of two upright posts 12 supporting a flexible idler 14 between them. The idler 14 comprises a plurality of axially spaced roller portions suitably rigidly secured to a neoprene covered steel wire cable, as is well known, terminating in a solid shaft portion 16 at each end which is rotatably supported within bearing housing assemblies 22. The upright posts 12 terminate in a swivel and trunion bracket 18 which accept two diametrically opposed cylindrical projections 20 of a bearing housing 24 of the bearing housing assemblies 22 to mount the idler 14 as in an oarlock permitting it movement in both horizontal and vertical planes.

Figure 2:
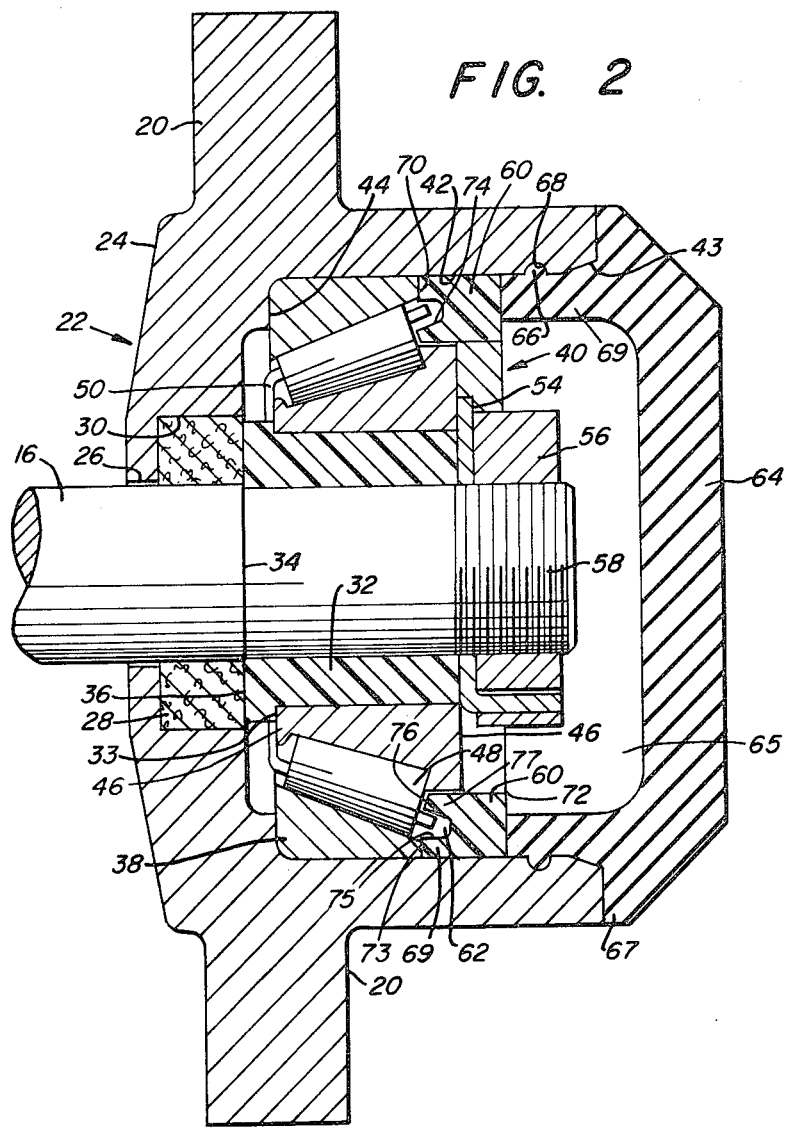
FIG. 2 is a cross-sectional view of the bearing housing assembly taken along line 2—2 of FIG. 1.

Each bearing housing assembly (FIG. 2) consists of a formed cup-shaped bearing housing 24 having a stepped bore comprising a series of axially spaced bore portions beginning with a clearance bore portion 26 at the inner end to accept the shaft portion 16 extending therethrough and terminating in a larger diameter bore portion 42 and chamfer 43 at the open end of said housing. The chamfer 43 demountably sealingly receives an elastomeric bearing housing end cap 64, thereby preventing the entrance of foreign matter into This end of the bearing housing 24 and retaining the lubricant in the enclosed bearing. The bearing housing end cap 64 is made of a suitably resilient material, such as rubber, consisting of; externally a stepped cylindrical shape having an internal cup shaped cavity 65 to clear and envelope the end of the shaft portion 16 projecting therein, and an external flange 67 projecting therefrom to locate and aid in the removal of the end cap 64 with respect to the bearing housing 24. A hollow cylindrical portion 69 of the bearing housing end cap 64, forward of the flange 67, has a circumferentially outwardly projecting elastomeric rib 66 of a generally hemispherical cross section formed thereon, that is matingly received by a circumferential groove 68 formed in bore portion 42 of the bearing housing 24 substantially at the inner end of chamfer 43. To insert the end cap 64 into the bearing housing 24, the outwardly projecting rib 66 slidingly engages the chamfer 43 at the end of bore portion 42 within housing 24 until matingly engaging groove 68 within bore portion 42, thereby securing end cap 64 to housing 24. A suitable flat tool, such as the end of a screwdriver, inserted between the edges of flange 67 of cap 64 and the end of the housing will disengage rib 66 from groove 68, thereby removing end cap 64 from bearing housing 24.

The bearing housing 24 has an intermediate diameter bore portion 30 immediately adjacent the clearance bore portion 26 suitably rigidly receiving, as by press fitting, a seal ring 28, of a suitable packable sealing material, such as felt, through which shaft portion 16 slidably passes, so as to seal the shaft and housing against the entrance of foreign matter through bore portion 26. A flanged cylindrical shaped bearing bushing 32 is suitably rigidly secured to the shaft portion 16, as by press fitting, abutting a shoulder 34 of shaft portion 16, thereby bringing a radial face 36 of the bushing 32 in contact with seal ring 28, packing the sealing material into bore portion 30 and around shaft portion 16 by means of axial forces acting on idler 14. The bearing bushing 36 is preferably made of a suitable moldable material, as is well known, such as plastic, for economic reasons. The bearing bushing is used between the shaft and bearing, as explained hereinbelow, because of the desire to use a larger capacity bearing with the given shaft diameter.

A tapered roller thrust bearing 40 consists of a bearing cup 38 suitably rigidly secured, as by press fitting, within bore portion 42 of housing 24 so as to abut a shoulder 44 formed therein, and a bearing cone 46, suitably rigidly secured, as by press fitting, to the bearing bushing 32, abutting shoulder 33 formed thereon, with bearing rollers 48 and bearing cage 50 assembled therebetween, as is well known, with the more open end of the bearing cage facing the bearing end cap 64. A locking thrust washer 54 and a lock nut 56 may be affixed to a threaded end 58 of shaft portion 16 thereby retaining the bearing bushing 32 and bearing cone 46 thereon.

A bearing retainer ring 60 of a suitably hard and relatively non-compressible material is suitably movably secured as by slip fitting, within bore 42 between bearing cup 38 and bearing housing end cap 64. The bearing retainer ring 60 has a circumferential groove 62 formed in a radial face to clear the open end of the bearing cage 50, with two radially spaced lips 75 and 77, outer and inner, respectively extending axially therefrom, and an internal diameter to clear the bearing cone 46. A radial plane surface 73 of the diametrically outward lip 75 extending axially from circumferential groove 62 abuts the flat plane surface 70 of the bearing cup 38, thereby locating the surface 76 of the second lip 77 axially extending diametrically inward from the circumferential groove 62, adjacent to the tapered rollers 48, relative to the roller bearing 40; the surface 76 adjacent to the rollers being substantially parallel to the end surfaces of said rollers in order to prevent the bearing cone 46 from breaking away from the bearing cup 38 when subject to incidental axial forces tending to do so. The circumferential surface 74 of the lip 77 adjacent to surface 76 is substantially parallel to the free end of bearing cage 50 and spaced radially inwardly therefrom to clear said cage and prevent interferences, as the cage will run somewhat eccentrically when the shaft is rotating. The radial outboard plane surface 72 of the retainer ring 60 is parallel to the inboard plane surface 73 and will abut the bearing housing end cap 64 to locate both the inboard plane surface 73 against the bearing cup 38 and surface 76 adjacent the rollers 48 to prevent breakaway of the cone from the cup.

The bearing housing assembly herein described serves to completely seal the inside of a bearing housing from the entrance of foreign matter, and utilizes a bearing retainer ring to prevent relative movement or break away of the bearing cup assembly from the bearing cone when reversed incidental axial forces are applied to the shaft of said bearing tending to cause such movement. The retainer ring eliminates the large expensive installation of double row or single row back to back tapered roller bearings as required under the conditions of such loading.

By following the principles taught by this invention, one skilled in the art can achieve the features of this invention with alterations to the preferred embodiment hereinbefore described, for example: variation in the internal and external configuration of the bearing housing 24, the seal ring 28, the bearing bushing 32, which may be eliminated by fitting the bearing cone 46 directly on the shaft 16 and against the seal ring 28, the retainer ring 60 as to move surface 76 shown adjacent to the rollers to be adjacent to the outer axial surface of the bearing cone 46, and the housing end cap 64 so as to seal on the outside of the bearing housing 20 rather than internally as shown.

What is claimed is:

1. In a bearing housing assembly for supporting one end of a flexible troughing idler for a belt conveyor the improvement comprising: a cup-shaped bearing housing, one single row tapered roller bearing assembly adapted to resist axial thrust in only one direction mounted in said housing, a bearing retainer ring having at least two axially effective radially spaced surfaces facing relatively axially movable members of said roller bearing assembly, said retainer ring mounted in said housing so that said surfaces are axially adjacent to said members in the direction opposite said one direction.

2. A bearing housing assembly as specified in claim 1 wherein said radially spaced, surfaces are portions of axially spaced parallel planes.

3. A bearing housing assembly as specified in claim 1 wherein said retainer ring has radially spaced axially extending lips whereon said surfaces are formed.

4. A bearing housing assembly as specified in claim 1 wherein said retainer ring is formed of a hard relatively non-compressible non-metallic material.

5. A bearing housing assembly as specified in claim 1 wherein said retainer ring is located within said housing by a cup-shaped end cap mounted in the open end of said bearing housing.

6. In a bearing housing assembly for supporting an end of a belt conveyor idler the improvement comprising: a rigid bearing housing having an open ended chamber therein the inner portion of which is a configuration to support a bearing assembly for a conveyor idler; said housing having a continuous circumferential groove located inwardly adjacent said open end; and a deformable elastomeric end cap for closing said open end of said chamber including a continuous circumferential rib portion extending around a peripheral portion of said end cap and received within said groove to maintain said end cap in sealing engagement with the surfaces of said housing adjacent thereto.

7. A bearing housing assembly as specified in claim 6 the other end of said housing opposite said open end has a bore portion therethrough receiving a shaft end of such an idler with packing material surrounding said shaft inwardly adjacent said other end.

8. A bearing housing assembly as specified in claim 6 wherein said end cap locates and retains in position a retainer ring movably mated to said surface portion of said housing; said retainer ring has axially extended portions with radial surfaces facing relatively axially movable members of a single row tapered roller bearing assembly.

* * * * *

UNITED STATES PATENT OFFICE
CERTIFICATE OF CORRECTION

Patent No. 3,734,579        Dated May 22, 1973

Inventor(s) Gary B. Schumacher

It is certified that error appears in the above-identified patent and that said Letters Patent are hereby corrected as shown below:

Claim 1, lines 9 and 10, delete "in the direction opposite said one direction."

Signed and sealed this 18th day of December 1973.

(SEAL)
Attest:

EDWARD M. FLETCHER, JR.          RENE D. TEGTMEYER
Attesting Officer                Acting Commissioner of Patents